United States Patent
Shim

(10) Patent No.: US 7,392,126 B2
(45) Date of Patent: Jun. 24, 2008

(54) LINE PRESSURE CONTROL SYSTEM AND METHOD OF AN AUTOMATIC TRANSMISSION

(75) Inventor: Hyun Soo Shim, Gwangmyeong (KR)

(73) Assignee: Hyundai Motor Company, Seoul (KR)

( * ) Notice: Subject to any disclaimer, the term of this patent is extended or adjusted under 35 U.S.C. 154(b) by 807 days.

(21) Appl. No.: 10/998,523

(22) Filed: Nov. 29, 2004

(65) Prior Publication Data

US 2005/0119814 A1 Jun. 2, 2005

(30) Foreign Application Priority Data

Dec. 2, 2003 (KR) .................... 10-2003-0086651

(51) Int. Cl.
*F16H 61/26* (2006.01)
*G06F 19/00* (2006.01)
(52) U.S. Cl. ............................. 701/51; 701/67; 701/87; 477/158
(58) Field of Classification Search ................... 701/51, 701/53, 67, 84, 87, 90; 477/50, 158, 161, 477/166, 34, 64
See application file for complete search history.

(56) References Cited

U.S. PATENT DOCUMENTS

| | | | |
|---|---|---|---|
| 4,843,920 A | 7/1989 | Hayasaki et al. | |
| 5,842,953 A | 12/1998 | Yasue et al. | |
| 6,648,796 B2 * | 11/2003 | Yeo | 477/64 |
| 6,832,977 B2 * | 12/2004 | You | 477/161 |

FOREIGN PATENT DOCUMENTS

| | | |
|---|---|---|
| DE | 3627611 A1 | 8/1986 |
| DE | 69524503 T | 8/2002 |
| JP | 09-229169 | 2/1997 |

\* cited by examiner

*Primary Examiner*—Tan Q Nguyen
(74) *Attorney, Agent, or Firm*—Morgan Lewis & Bockius LLP

(57) ABSTRACT

A dynamic characteristic of a hydraulic pressure is significantly enhanced since a line pressure control system. A method employed by the system includes determining whether a vehicle is in a power-on state, determining whether a damper clutch is being engaged when the vehicle is in the power-on state, compensating a line pressure duty determined on the basis of an engine torque with a first compensation duty determined on the basis of a vehicle speed and an operation state of the damper clutch when the damper clutch is being engaged under the power-on state, and controlling the line pressure according to the compensated line pressure duty.

8 Claims, 3 Drawing Sheets

<Power-on state>

(I) RPM (II) Damper clutch pressure duty (III) Line pressure compensation duty (IV) Line pressure <Power-off state>

(I) RPM (II) Damper clutch pressure duty (III) Line pressure compensation duty (IV) Line pressure

LINE PRESSURE CONTROL SYSTEM AND METHOD OF AN AUTOMATIC TRANSMISSION

CROSS REFERENCE TO RELATED APPLICATIONS

This application claims priority of Korean Application No. 10-2003-0086651, filed Dec. 2, 2003, the disclosure of which is incorporated herein by reference.

FIELD OF THE INVENTION

The present invention relates to an automatic transmission. More particularly, the present invention relates to a line pressure control system and method for an automatic transmission.

BACKGROUND OF THE INVENTION

Generally, an automatic transmission (AT) includes a torque converter and a powertrain of a multiple speed gear mechanism connected to the torque converter. In addition, a hydraulic control system is provided with an AT for selectively operating at least one operational element included in the powertrain, based on the running state of the vehicle.

Such an AT also includes a hydraulic pressure source supplying a hydraulic pressure, a main line connected to the hydraulic pressure source in order to guide the hydraulic pressure, distributing lines branching from the main line in order to respectively guide the hydraulic pressure to the operational elements, and a valve provided respectively at the distributing lines in order to control the hydraulic pressure inflowing into the operational elements. In addition, to control a main line hydraulic pressure (hereinafter called "line pressure"), a conventional AT typically uses a mechanical control means controlling the line pressure according to a map table predetermined on the basis of only a throttle valve opening.

However, such a mechanical control means has the following problem. Since the line pressure is controlled according to the map table predetermined on the basis of only a throttle valve opening, a problem can occur in that dynamic characteristics of the hydraulic pressure inflowing into the operational elements is deteriorated.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide a line pressure control system and method of an automatic transmission having non-limiting advantages of an enhanced dynamic characteristic of hydraulic pressure inflowing into a damper clutch.

An exemplary line pressure control system of an automatic transmission according to an embodiment of the present invention includes: an engine torque detector for detecting an engine torque; a vehicle speed detector for detecting a vehicle speed; and an electronic control unit for controlling a line pressure on the basis of the engine torque, the vehicle speed, and an operation state of a damper clutch. The electronic control unit may be programmed to execute instructions for an exemplary line pressure control method of an automatic transmission described below.

An exemplary line pressure control method of an automatic transmission according to an embodiment of the present invention includes: determining whether a vehicle is in a power-on state; determining whether a damper clutch is being engaged, when the vehicle is in the power-on state; compensating a line pressure duty determined on the basis of an engine torque with a first compensation duty determined on the basis of a vehicle speed and an operation state of the damper clutch, when the damper clutch is being engaged under the power-on state; and controlling a line pressure according to the compensated line pressure duty.

In a further embodiment according to the present invention, the method further includes: determining whether a damper clutch is in a direct engagement state, when the vehicle is in a power-off state; compensating a line pressure duty determined on the basis of an engine torque with a second compensation duty determined on the basis of a vehicle speed and an operation state of the damper clutch, when the damper clutch is in a direct engagement state under the power-off state; and controlling the line pressure according to the compensated line pressure duty.

In another further embodiment according to the present invention, the first compensation duty becomes greater than the second compensation duty, under a same vehicle speed.

In another further embodiment according to the present invention, the first compensation duty becomes twice the size of the compensation control duty, under the same vehicle speed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
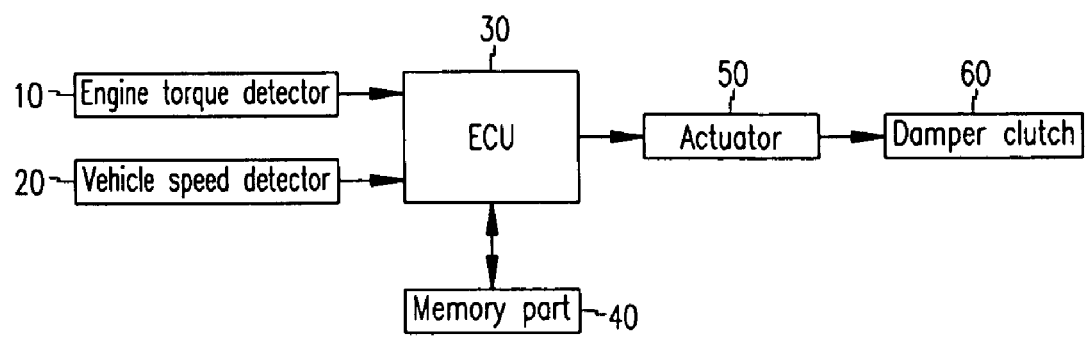
FIG. 1 is a block diagram of a line pressure control system of an automatic transmission according to an embodiment of the present invention.

As shown in FIG. 1, a line pressure control system of an automatic transmission according to an embodiment of the present invention includes an engine torque detector 10, a vehicle speed detector 20, an electronic control unit 30, a memory part 40, and an actuator 50. The engine torque detector 10 detects an engine torque. The vehicle speed detector 20 detects a current vehicle speed on the basis of an output rpm of the automatic transmission, and may be a PG-B sensor. The electronic control unit (ECU) 30 controls the line pressure on the basis of the engine torque, the vehicle speed, and operation state of a damper clutch 60. The actuator 50 may include a solenoid valve, and generates the line pressure that is supplied to a damper clutch 60 according to a line pressure duty signal of the ECU 30.

The memory part 40 is a space where a plurality of map tables are memorized. The map tables include: a map table of a line pressure duty depending on the engine torque; a map table of a first compensation duty depending on the vehicle speed and the operation state of a damper clutch 60 while a damper clutch 60 is in a direct engagement state; and a map table of a second compensation duty depending on the vehicle speed and the operation state of a damper clutch 60 while a damper clutch 60 is controlled. Other data may also be stored.

The ECU 30 can be realized by one or more processors activated by a predetermined program, and the predetermined program can be programmed to perform each step of a method according to an embodiment of this invention. Memory part 40 may be any suitable storage device as may be selected and integrated with the overall system by persons of ordinary skill based on the teachings herein.

Figure 2:
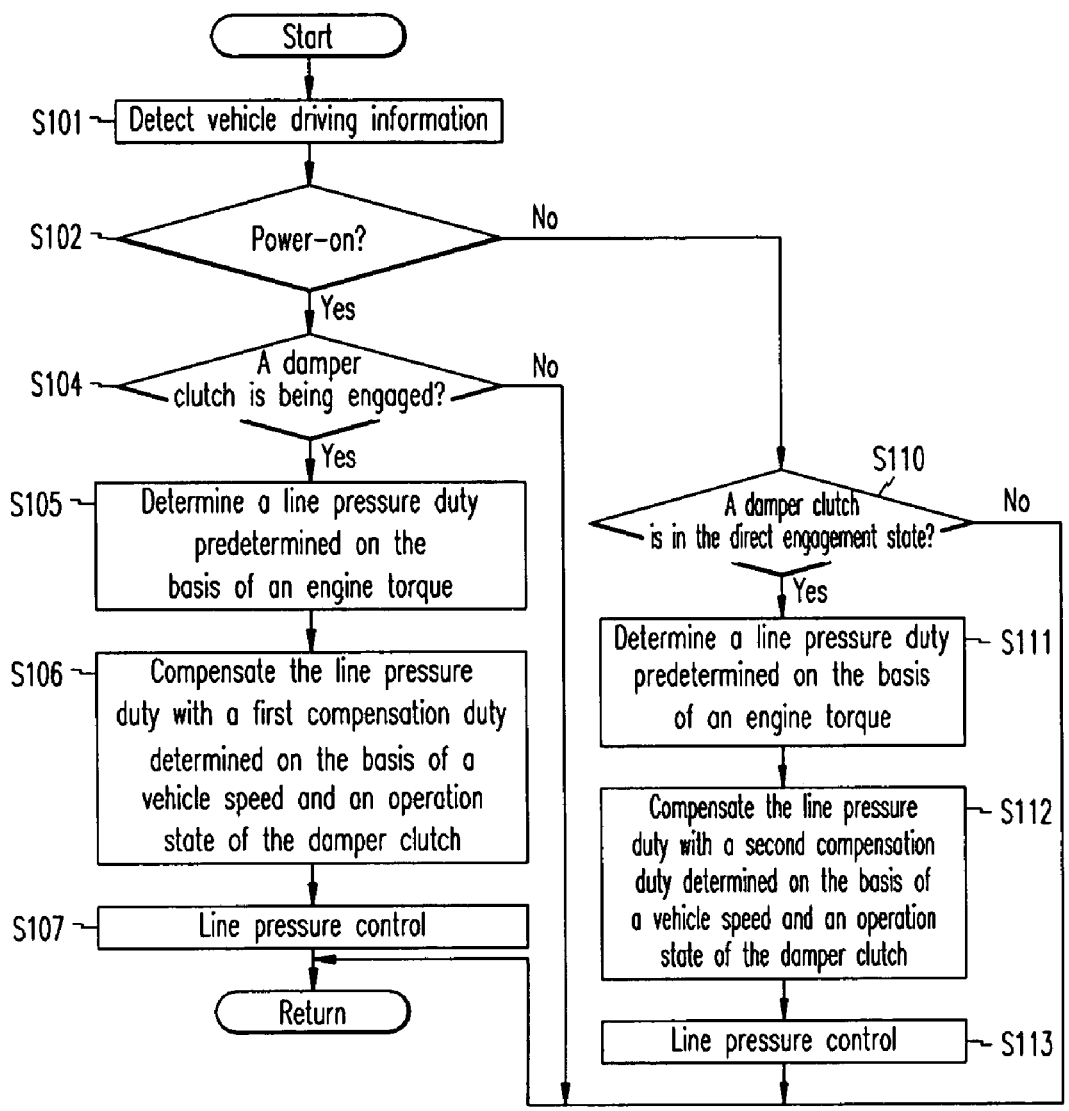
FIG. 2 is a flowchart showing a line pressure control method of an automatic transmission according to an embodiment of the present invention.

A line pressure control method of an automatic transmission according to an embodiment of the present invention will hereinafter be described in detail with reference to FIG. 2.

Firstly, at step S101, if a vehicle travels, the ECU 30 recognizes various vehicle driving information (e.g., the throttle valve opening, the vehicle speed, etc.). Particularly, the vehicle is provided with an automatic transmission executing a full time line pressure control.

At step S102, the ECU 30 determines whether the vehicle is in a power-on state (e.g., a state in which an accelerator pedal is depressed) through the recognized vehicle driving information.

When the vehicle is in a power-on state at the step 102, the ECU 30 determines, at step S104, whether the damper clutch 60 is being engaged.

When the damper clutch 60 is being engaged at the step S104, the ECU 30 determines, at step S105, the line pressure duty on the basis of an engine torque detected by the engine torque detector 10. For example, the line pressure duty may be determined from the map table memorized in the memory 40.

Figure 3:
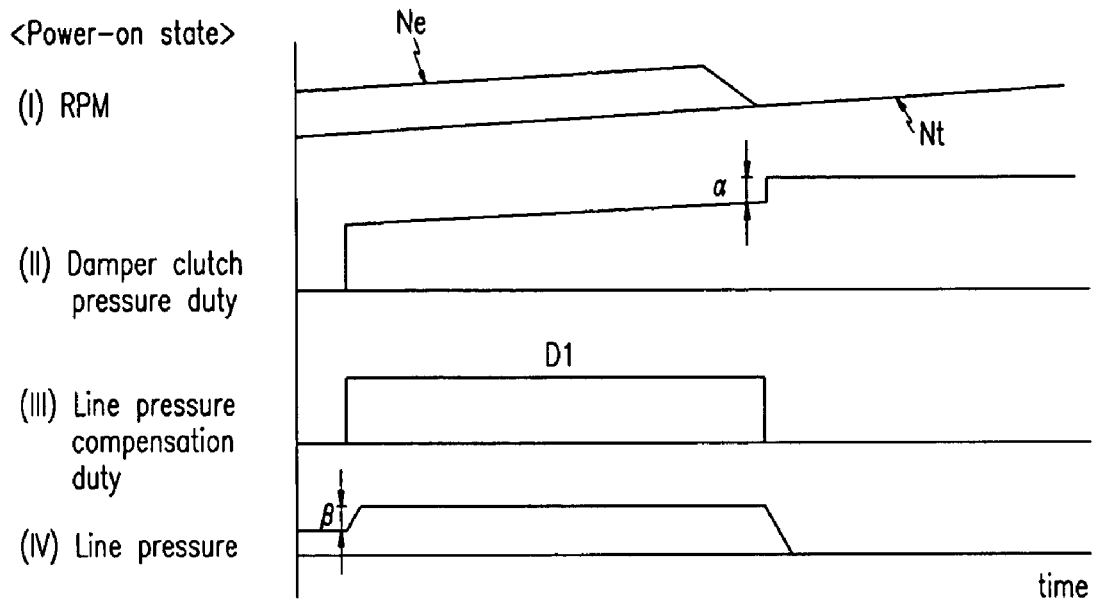
FIG. 3 is a graph showing a duty control pattern under a power-on state performed by an electronic control unit, in a line pressure control method of an automatic transmission according to an embodiment of the present invention.

At step S106, the ECU 30 compensates the determined line pressure duty with a first compensation duty (see "D1" of the FIG. 3). The first compensation duty may be determined on the basis of a vehicle speed detected by the vehicle speed detector 20 and the operation state of the damper clutch 60.

Under the power-on state, with a high engine torque in comparison with the power-off state in which an engine torque is not detected, a hydraulic pressure supplied into the damper clutch 60 must be higher than a hydraulic pressure under the power-off state, in order to safely engage the damper clutch 60.

Accordingly, it is preferable that the first compensation duty D1 is higher than a below-mentioned second compensation duty (see "D1" in FIG. 4), under a same vehicle speed.

Furthermore, the first compensation duty D1 may be determined through experiments, and such a determined first compensation duty is memorized in the memory part 40

Consequently, at step S107, the ECU 30 controls the line pressure according to the line pressure duty compensated with the first compensation duty D1.

Accordingly, a dynamic characteristic of a hydraulic pressure supplied into the damper clutch 60 can be enhanced by the line pressure duty compensated with the first compensation duty D1.

When the vehicle is not in the power-on state (e.g., a state in which the accelerator pedal is released) at the step 102, the ECU 30 determines, at step S110, whether the damper clutch 60 is in a direct engagement state.

When the damper clutch 60 is in a direct engagement state at the step S110, the ECU 30 determines, at step S111, the line pressure duty on the basis of an engine torque detected by the engine torque detector 10.

Figure 4:
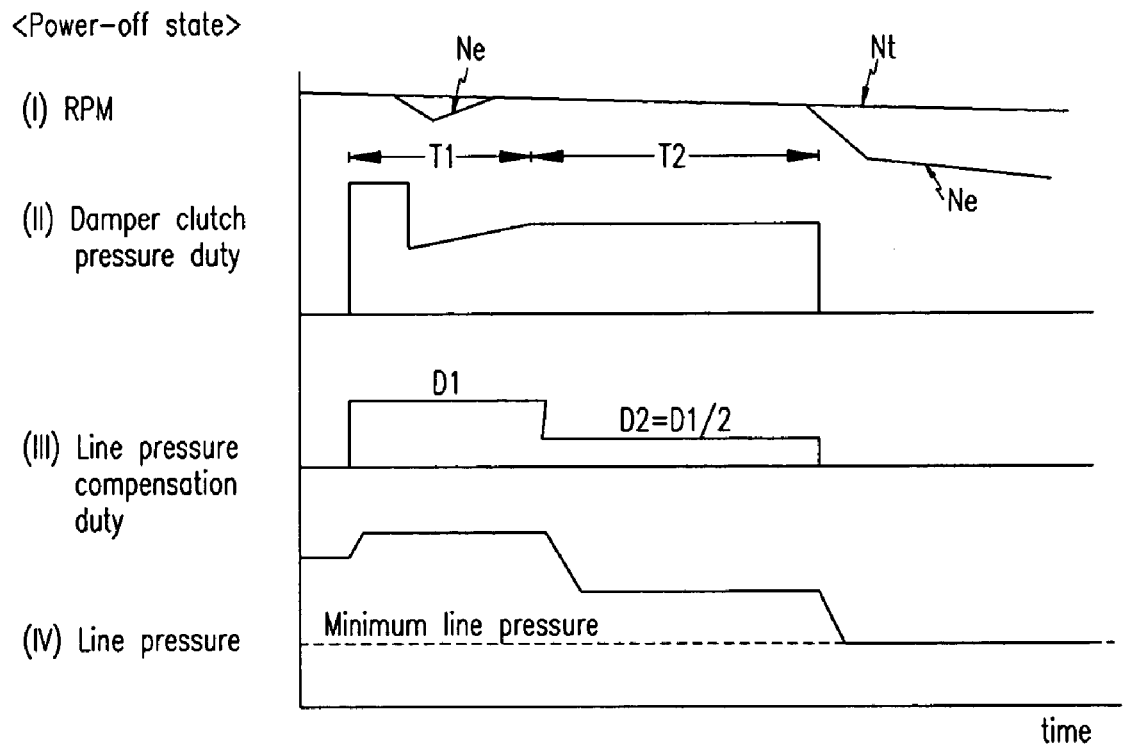
FIG. 4 is a graph showing a duty control pattern under a power-off state performed by an electronic control unit, in a line pressure control method of an automatic transmission according to an embodiment of the present invention.

At step S112, the ECU 30 compensates the determined line pressure duty with a second compensation duty (see "D2" of the FIG. 4). The second compensation duty may be determined on the basis of a vehicle speed detected by the vehicle speed detector 20 and the operation state of the damper clutch 60.

The first compensation duty D1 is determined to be greater than the second compensation duty D2, under a same vehicle speed. Since an engine torque is "0" under the power-off state, a hydraulic pressure supplied into the damper clutch 60 under the power-off state need not be bigger than a hydraulic pressure under the power-on state.

Furthermore, if the hydraulic pressure becomes small, a load of a hydraulic pump can be decreased, so that a load of an engine can also be decreased and thereby a fuel mileage can be enhanced.

Accordingly, to enhance the fuel mileage, it is preferable that the second compensation duty D2 becomes relatively smaller than the first compensation duty D1 under the power on.

Furthermore, the second compensation duty D2 may be determined through experiments, and such a determined second compensation duty is memorized in the memory part 40

Consequently, at step S113, the ECU 30 controls the line pressure according to the line pressure duty compensated with the second compensation duty D2.

Accordingly, if the line pressure is controlled by the line pressure duty compensated with the second compensation duty D2, not only can a dynamic characteristic of a hydraulic pressure supplied into the damper clutch 60 be enhanced, but also the fuel mileage can be enhanced.

A line pressure control of an ECU under the power-on state will hereinafter be described in detail with reference to the FIG. 3.

When the vehicle driving information are determined that the damper clutch 60 is being engaged, the ECU 30 controls, as shown in reference symbol □, a damper clutch pressure duty in order to engage the damper clutch 60.

While the damper clutch 60 is being engaged, the ECU 30 outputs, as shown in reference symbol III, the first compensation duty D1 predetermined on the basis of a current vehicle speed and an operation state of the damper clutch 60 in order to enhance a dynamic characteristic of a hydraulic pressure supplied into the damper clutch 60.

Consequently, as shown in reference symbol □, the line pressure is increased as much as β by the line pressure duty compensated with the first compensation duty D1.

When an engine rpm Ne is equal to a turbine rpm Nt as shown in reference symbol I, the ECU 30 stops, as shown in reference symbol III, an output of the first compensation duty D1.

As shown in reference symbol II, the ECU 30 increases the damper clutch pressure duty by α at a time point when the engine rpm Ne is equal to the turbine rpm Nt, in order to safely engage the damper clutch 60.

The α is a minimum value determined through experiments.

A line pressure control of an ECU under the power-off state will hereinafter be described in detail with reference to the FIG. 4.

Firstly, in a graph of FIG. 4, there is a first interval T1 that an engine rpm Ne is different from a turbine rpm Nt, and a second interval T2 that an engine rpm Ne is equal to a turbine rpm Nt.

During the first interval T1, the ECU 30 outputs, as shown in reference symbol VI, a damper clutch pressure duty, and outputs, as shown in reference symbol VII, the first compensation duty D1 predetermined on the basis of a current vehicle speed and an operation state of the damper clutch 60.

When the damper clutch 60 is in direct engagement by the above-mentioned damper clutch pressure duty, the second interval T2 is started.

During the second interval T2, the ECU 30 outputs, as shown in reference symbol VI, a damper clutch pressure duty, and outputs, as shown in reference symbol VII, the second compensation duty D2 predetermined on the basis of a current vehicle speed and an operation state of the damper clutch 60.

Particularly, since the damper clutch 60 is in direct engagement under the power-off state (that is, the state in which an engine torque is "0"), it is preferable that the second compensation duty D2 becomes smaller than the first compensation duty D1 in order to enhance a fuel mileage.

In addition, according to experiments, it is more preferable that the second compensation duty D2 becomes half the first compensation duty D1.

Consequently, as shown in reference symbol VIII, the ECU 30 controls the line pressure according to the line pressure duty compensated with the second compensation duty D2.

After this, when the engine rpm Ne is different from the turbine rpm Nt as shown in reference symbol V, the ECU 30 maintains, as shown in reference symbol VIII, a minimum line pressure. Particularly, if the minimum line pressure may be maintained, it can be interpreted that hydraulic pressure performance is deteriorated under the power-off state.

As has been explained, the line pressure control method of an automatic transmission according to embodiments of the present invention has the following advantages.

According to an embodiment of the present invention, since the line pressure control is executed differently according to vehicle driving conditions, a dynamic characteristic of a hydraulic pressure supplied into the damper clutch can be enhanced.

All the advantages described in the specification are inclusive.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A line pressure control method of an automatic transmission, comprising:
   determining whether a vehicle is in a power-on state;
   determining whether a damper clutch is being engaged, when the vehicle is in the power-on state;
   compensating a line pressure duty determined on the basis of an engine torque with a first compensation duty determined on the basis of a vehicle speed and an operation state of the damper clutch, when the damper clutch is being engaged under the power-on state; and
   controlling a line pressure according to the compensated line pressure duty.

2. The method of claim 1, further comprising:
   determining whether a damper clutch is in a direct engagement state, when the vehicle is in a power-off state;
   compensating a line pressure duty determined on the basis of an engine torque with a second compensation duty determined on the basis of a vehicle speed and an operation state of the damper clutch, when the damper clutch is in direct engagement under the power-off state; and
   controlling the line pressure according to the compensated line pressure duty.

3. The method of claim 2, wherein the first compensation duty is greater than the second compensation duty, under a same vehicle speed.

4. The method of claim 2, wherein the first compensation duty is twice the size of the second compensation duty, under a same vehicle speed.

5. A line pressure control system of an automatic transmission comprising
   an engine torque detector for detecting an engine torque,
   a vehicle speed detector for detecting a vehicle speed, and
   an electronic control unit for controlling a line pressure on the basis of the engine torque, the vehicle speed, and an operation state of a damper clutch,
   wherein the electronic control unit is programmed to execute instructions for: determining whether a vehicle is in a power-on state;
   determining whether the damper clutch is being engaged, when the vehicle is in the power-on state;
   compensating a line pressure duty determined on the basis of the engine torque with a first compensation duty determined on the basis of the vehicle speed and the operation state of the damper clutch, when the damper clutch is being engaged under the power-on state; and
   controlling the line pressure according to the compensated line pressure duty.

6. The system of claim 5, wherein the electronic control unit is further programmed to execute instructions for:
   determining whether a damper clutch is in a direct engagement state, when the vehicle is in a power-off state;
   compensating a line pressure duty determined on the basis of an engine torque with a second compensation duty determined on the basis of a vehicle speed and an operation state of the damper clutch, when the damper clutch is in the direct engagement under the power-off state; and
   controlling the line pressure according to the compensated line pressure duty.

7. The system of claim 6, wherein the first compensation duty is higher than the second compensation duty, under a same vehicle speed.

8. The method of claim 6, wherein the first compensation duty is twice the size of the second compensation duty, under a same vehicle speed.

* * * * *